Patented Jan. 2, 1951

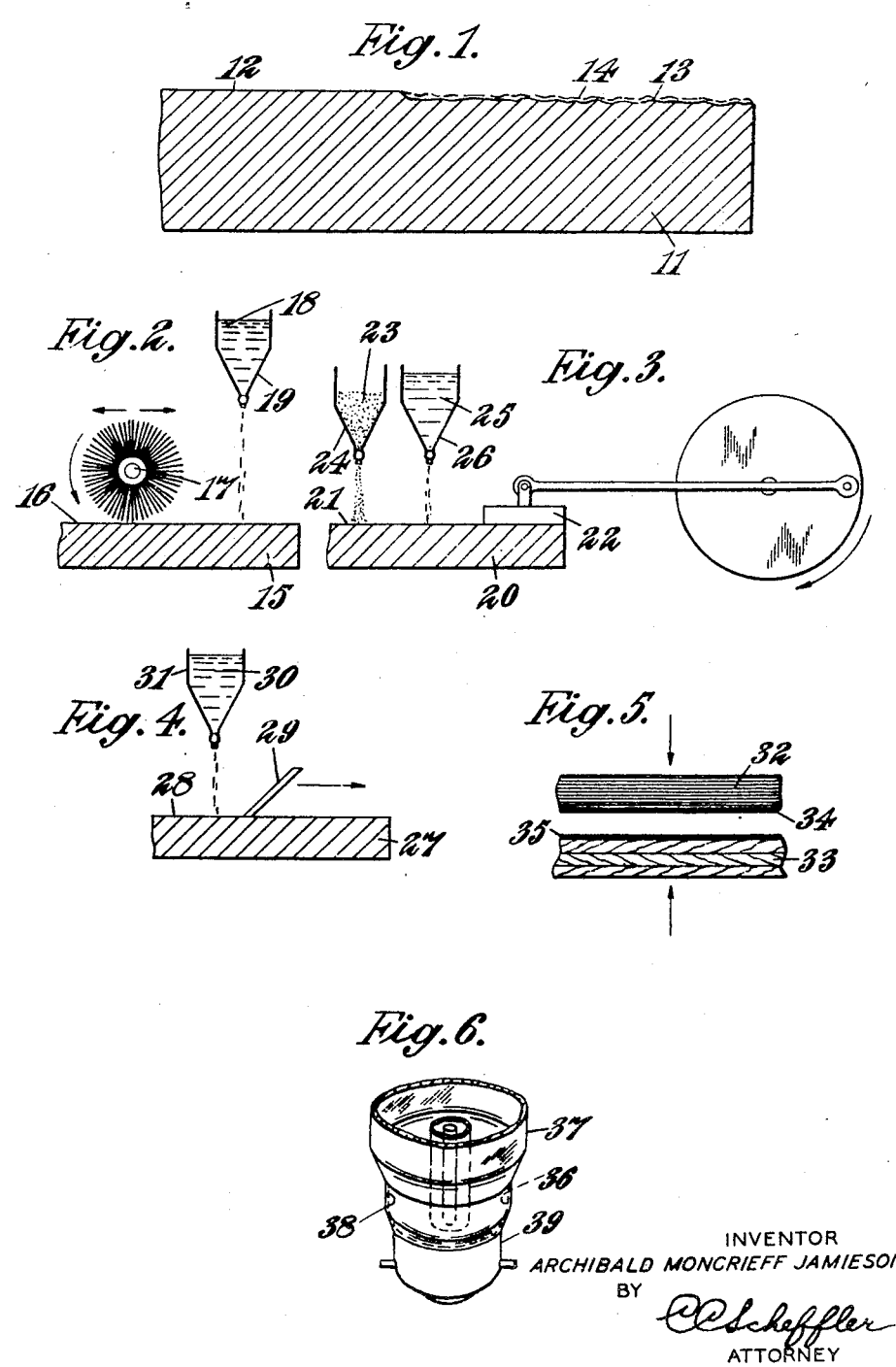

2,536,183

UNITED STATES PATENT OFFICE 2,536,183

PREPARATION OF SURFACES FOR ADHESION

Archibald Moncrieff Jamieson, Brackley, Northants, England, assignor, by mesne assignments, to Union Carbide and Carbon Corporation, a corporation of New York Application March 3, 1945, Serial No. 580,737
In Great Britain March 20, 1944

20 Claims. (Cl. 154—140)

This invention is for improvements in or relating to the preparation of surfaces for adhesion and has particular reference to the treatment of surfaces of hardened synthetic resin so as to make them more strongly adherent. It further relates to composite products prepared from or including one or more of such surface-treated materials.

It is an object of the invention to obtain more efficient and consistent adhesion of surfaces including surfaces of hardened synthetic resin than has hitherto been possible.

It has been found that the above-mentioned object may be achieved by abrading the surface, e. g. of a hardened synthetic resinous product in the presence of a liquid phenol-aldehyde condensation product.

According to the present invention, a process for the preparation of a surface, e. g. of a hardened synthetic resin, for adhesion by means of a phenol-aldehyde adhesive includes the step of abrading the surface in the presence of a liquid phenol-aldehyde condensation product. The term "abraded" as used in this specification means the removal of surface material by mechanical means.

The invention may be applied with particular advantage to the prepartion of a surface of a hardened synthetic resin which is to be bonded to another similarly prepared surface, or to another unprepared surface.

Among other surfaces which may be bonded by use of the present invention glass and metal may be mentioned.

The invention also comprises the manufacture of a composite product by securing the abraded surface (e. g. after removal of surplus liquid phenol-aldehyde condensation product and any abradant grit) to another surface, which in the case of a hardened synthetic resin product may have been similarly prepared, by means of a phenol-aldehyde adhesive.

The phenol-aldehyde adhesive may consist of the residual liquid phenol-aldehyde condensation product remaining on the abraded surface or surfaces after the abrading operation.

The liquid phenol-aldehyde condensation product employed in the abrading operation may be a solution of the condensation product, e. g. in an alcoholic solvent, a condensation product which is liquid at room temperature, or a molten condensation product which is solid at room temperature.

The phenol-aldehyde adhesive may be an acid-accelerated product made by incorporating an acid such as hydrochloric, phosphoric or a sulphonic acid with the product formed by reacting phenol and aqueous formaldehyde in the presence of an alkaline condensing agent and the same product with or without an acid accelerator may be used in the abrading operation. When the acid-accelerated product is used in the abrading operation, the treated surface is preferably incorporated in a composite product without undue delay.

It will be understood that it may be necessary to avoid in the abrading and bonding operations the use of constituents which either attack one or both of the surfaces to be bonded or deleteriously affect the adhesion. Thus, it may be necessary to avoid the use of acid-accelerated adhesive when one or both of the surfaces consist of metal attacked by the acid.

The hardened synthetic resin product to which the present invention may be applied may consist predominantly of the resinous product itself, but it may also comprise bonded fibrous materials. The fibrous materials or fillers may be in the form of discrete particles as, for instance, in the case of a mouldable composition containing wood flour, or they may be in sheet form such as paper, textile material or wood veneers disposed in laminated arrangement. The hardened synthetic resin product may consist of the hardened condensation product of an aldehyde, such as formaldehyde, with a phenol, a urea, or an aminotriazine.

The abrading step may be carried out by any of the known methods, such for instance as with a rotating wire brush or metal scraper, or by the application of emery paper, an abrasive stone, or abrasive grit. The abrasive grit may conveniently be suspended in the liquid condensation product.

Following is a description by way of example only and with reference to the accompanying diagrammatic drawings of methods of carrying the invention into effect.

In the drawing:

Figure 1 shows on an enlarged scale a portion 11 of a sheet of material to be treated by the present invention. The smooth surface of the sheet before treatment is shown at 12. 13 shows a portion of the surface which has been abraded in the presence of a liquid phenol-aldehyde condensation product and 14 shows liquid condensation product adhering to the surface 13.

Figure 2 shows a sheet 15, the surface 16 of which is undergoing abrasion by means of a rotating and reciprocating wire brush 17 while liquid phenol-aldehyde condensation product 18 is fed to the surface from a container 19.

Figure 3 shows a portion of a sheet 20, the upper surface 21 of which is undergoing abrasion by means of the reciprocating rubber 22 while abrasive grit 23 is fed to the surface from a container 24 and liquid phenol-aldehyde condensation product 25 from the container 26. If desired, the rubber 22 may consist of abrasive stone and in that case it is unnecessary to feed to the surface of the sheet abrasive grit 23.

Figure 4 shows a portion of a sheet 27, the upper surface 28 of which is abraded by means of a scraper, e. g. a metal scraper 29, in the presence of a liquid phenol-aldehyde condensation product 30 from the container 31.

Figure 5 shows the assembly of a laminated sheet 32 (the surface of which has been abraded by one of the methods illustrated in Figures 2 to 4) and a plywood sheet 33. The abraded surface and the surface of the plywood is coated with an acid-accelerated phenol-aldehyde condensation product as at 34 and 35.

Figure 6 shows diagrammatically the application of the invention to the metal capping of an electric lamp bulb. The lower portion 36 of the envelope 37 of an incandescent electric lamp is treated by the present invention as is also the corresponding surface 38 of the metal cap 39 prior to sealing the glass and metal together by adhesive.

Example I

This example describes the preparation for adhesion of a laminated sheet consisting of layers of cambric impregnated with and bonded by a hardened cresol-formaldehyde resin. The surface of such a laminated sheet was rubbed with an abrasive stone in the presence of a 10% solution in industrial spirit of a phenol-formaldehyde condensation product made by reacting phenol and aqueous formaldehyde in the presence of an alkaline condensing agent. (See Figures 1 and 3.) Surplus solution and abrasive grit were removed leaving the surface activated for adhesion. The surface retains its activity without appreciable diminution of its potentially-adherent properties over a period of 5 to 6 weeks at normal temperatures.

Example II

This example describes the preparation of composite products embodying a laminated sheet, the surface or surfaces of which have been treated as described in Example I. A liquid phenol-aldehyde condensation product made by reacting phenol and aqueous formaldehyde in the presence of an alkaline condensing agent and containing toluene sulphonic acid as an accelerator of hardening was applied to the surface of a laminated sheet made as described in Example I, and to the surface of a plywood sheet to which it is to be attached. (See Figure 5.) The surfaces to be joined are assembled, subjected to light clamping pressure and allowed to harden at room temperature. The clamps may be removed after about 6 hours and the bond is sufficiently hard for testing purposes after 48 hours. A slight increase in bond strength may be detected after this period, but for practical purposes the increase in strength is negligible.

Instead of securing the treated surface of the laminated sheet to a dissimilar surface it may be secured to a similar laminated sheet which preferably is first treated in the manner above described. Thus, a cover box for electrical terminals may be made of such laminated sheet and the areas of the box sides which are to be in contact may be treated according to the process of the invention prior to the application of adhesive.

Example III

This example describes the preparation of a composite product one of the elements whereof consists of glass.

The glass surface to be bonded was abraded with Carborundum grit in the presence of a heat-hardenable liquid phenol-formaldehyde condensation product and surplus condensation product and grit removed. The activated surface was bonded to metal by means of a heat-hardenable phenol-aldehyde adhesive and subjecting to heat.

This method may be applied with advantage to the metal capping of electric lamp bulbs and thermionic valves and in this case the adhesive may conveniently embody a proportion of mineral filler and hardening effected by heating for 5 minutes at 160° to 200° C. (See Figure 6.)

Example IV

This example describes the preparation of a metal surface for subsequent bonding to wood.

The surface of a sheet of motor-body steel was abraded with a wire brush in the presence of a 10% solution in industrial spirit of an alkali-condensed phenol-formaldehyde condensation product. The abraded surface after the solvent had evaporated was bonded to a wood veneer using as adhesive a sheet of paper impregnated with a heat-hardenable phenol-formaldehyde adhesive by heating at 135° C. for 10 minutes under a pressure of 300 lbs./sq. in.

Experimental results show that the process of the present invention not only gives stronger bonds than those of a series of control tests carried out without the abrading operation but also reduces the percentage variation in bond strength.

I claim:

1. A process for the preparation of a surface for adhesion by means of a phenol-aldehyde adhesive which process includes the step of abrading the surface in the presence of a liquid phenol-aldehyde condensation product to form an activated, abraded bonding surface coated with at least a residual amount of the phenol-aldehyde condensation product after removal of abraded material.

2. A process for the preparation of a surface of a hardened synthetic resin for adhesion by means of a phenol-aldehyde adhesive which process includes the step of abrading the surface of the said hardened synthetic resin in the presence of a liquid phenol-aldehyde condensation product to form an activated, abraded bonding surface coated with at least a residual amount of the phenol-aldehyde condensation product after removal of abraded material.

3. A process for the preparation of a surface of resin-bonded fibrous material for adhesion by means of a phenol-aldehyde adhesive which process includes the step of abrading the surface of the said resin-bonded fibrous material in the presence of a liquid phenol-aldehyde condensation product to form an activated, abraded bonding surface coated with at least a residual amount of the phenol-aldehyde condensation product after removal of abraded material.

4. A process for the preparation of a surface of a hardened condensation product of formaldehyde with a phenol for adhesion by means of a phenol-aldehyde adhesive which process includes the step of abrading the surface of the said hardened phenol-formaldehyde condensation product in the presence of a liquid phenol-aldehyde condensation product to form an activated, abraded bonding surface coated with at least a residual amount of the phenol-aldehyde condensation product after removal of abraded material.

5. A process for the preparation of a surface of a hardened condensation product of formaldehyde with a urea for adhesion by means of a phenol-aldehyde adhesive which process includes the step of abrading the surface of the said hardened condensation product of formaldehyde with a urea in the presence of a liquid phenol-aldehyde condensation product to form an activated, abraded bonding surface coated with at least a residual amount of the phenol-aldehyde condensation product after removal of abraded material.

6. A process for the preparation of a surface of a hardened condensation product of an aldehyde with an aminotriazine for adhesion by means of a phenol-aldehyde adhesive which process includes the step of abrading the surface of the said hardened condensation product in the presence of a liquid phenol-aldehyde condensation product to form an activated, abraded bonding surface coated with at least a residual amount of the phenol-aldehyde condensation product after removal of abraded material.

7. A process for the preparation of a surface of metal for adhesion by means of a phenol-aldehyde adhesive which process includes the step of abrading the surface of the metal in the presence of a liquid phenol-aldehyde condensation product to form an activated, abraded bonding surface coated with at least a residual amount of the phenol-aldehyde condensation product after removal of abraded material.

8. A process for the preparation of a surface of glass for adhesion by means of a phenol-aldehyde adhesive which process includes the step of abrading the surface of the glass in the presence of a liquid phenol-aldehyde condensation product to form an activated, abraded bonding surface coated with at least a residual amount of the phenol-aldehyde condensation product after removal of abraded material.

9. A process for the preparation of a surface for adhesion by means of a phenol-aldehyde adhesive which process includes the step of abrading the surface in the presence of a liquid phenol-aldehyde condensation product to form an activated, abraded bonding surface coated with at least a residual amount of the phenol-aldehyde condensation product after removal of abraded material, the said liquid comprising a solution of the said condensation product in an alcoholic solvent.

10. A process for the preparation of a surface for adhesion by means of a phenol-aldehyde adhesive which process includes the step of abrading the surface in the presence of a phenol-aldehyde condensation product which is liquid at room temperature to form an activated, abraded bonding surface coated with at least a residual amount of the phenol-aldehyde condensation product after removal of abraded material.

11. A process for the preparation of a surface for adhesion by means of a phenol-aldehyde adhesive which process includes the step of abrading the surface in the presence of a molten phenol-aldehyde condensation product which is solid at room temperature to form an activated, abraded bonding surface coated with at least a residual amount of the phenol-aldehyde condensation product after removal of abraded material.

12. A process for the preparation of a surface for adhesion which process comprises the step of abrading the said surface in the presence of an alkaline-condensed acid-accelerated phenol-aldehyde adhesive product to form an activated, abraded bonding surface coated with at least a residual amount of the phenol-aldehyde condensation product after removal of abraded material.

13. A process for the preparation of a surface for adhesion which process comprises the step of abrading the said surface in the presence of an alkaline-condensed phenol-aldehyde adhesive product to form an activated, abraded bonding surface coated with at least a residual amount of the phenol-aldehyde condensation product after removal of abraded material.

14. A process for the preparation of a surface for adhesion by means of a phenol-aldehyde adhesive which process includes the step of abrading the surface with abrasive grit suspended in a liquid phenol-aldehyde condensation product to form an activated, abraded bonding surface coated with at least a residual amount of the phenol-aldehyde condensation product after removal of abraded material.

15. A process for preparing a composite bonded article which process comprises carrying out an abrading operation on at least one of each pair of surfaces to be bonded, said abrading operation being carried out in the presence of a liquid phenol-aldehyde condensation product, retaining at least a residual amount of the condensation product on the abraded surface and thereafter applying a phenol-aldehyde adhesive to the surfaces to be bonded, pressing the surfaces into intimate contact and curing the phenol-aldehyde condensation product and adhesive.

16. A process for bonding a pair of surfaces of hardened synthetic resin which comprises abrading the said surfaces in the presence of a liquid phenol-aldehyde condensation product, removing from the said surfaces surplus liquid, abraded material and any abradant grit employed, applying a phenol-aldehyde adhesive to the abraded surfaces, bringing the said surfaces into intimate contact under pressure and curing the adhesive and the condensation product.

17. A process for bonding a pair of surfaces which process comprises abrading the said surfaces in the presence of a liquid phenol-aldehyde condensation product, retaining at least a residual amount of said liquid product on said surfaces and thereafter bonding the abraded surfaces by bringing them together and applying pressure while curing the condensation product.

18. An element, a surface of which is to be bonded to another element by phenol-aldehyde adhesive, said surface being activated by having a film of uncured phenol-aldehyde condensation product simultaneously intimately associated with abrasions formed on said surface.

19. A composite article comprising a least two elements bonded together with phenol-aldehyde adhesive, at least one of the elements employed in the composite article corresponding to an element as defined in claim 18.

20. A process for the preparation of an improved adhesive surface on thermosetting resin-bonded fibrous material which comprises simultaneously mechanically abrading a surface of the material and wetting said surface as it is being abraded with a thermosetting phenol-aldehyde condensation product in liquid form, thereafter removing all loose abraded material and only surplus liquid condensation product from the abraded surface thereby retaining a residual amount of said product as an adhesive coating on the abraded surface.

ARCHIBALD MONCRIEFF JAMIESON.

REFERENCES CITED

The following references are of record in the file of this patent:

UNITED STATES PATENTS

| Number | Name | Date |
|---|---|---|
| 1,019,407 | Baekeland | Mar. 5, 1912 |
| 1,157,572 | Moench | Oct. 19, 1915 |
| 1,565,532 | Tupper | Dec. 15, 1925 |
| 2,006,770 | Jones | July 2, 1935 |
| 2,414,415 | Rhodes | Jan. 14, 1947 |